United States Patent Office 2,876,155
Patented Mar. 3, 1959

2,876,155
FUNGICIDAL COMPOSITIONS

Frank L. Howard and Barbara C. Cormier, South Kingstown, R. I., assignors, by mesne assignments, to Mallinckrodt Chemical Works, St. Louis, Mo., a corporation of Missouri No Drawing. Application February 20, 1957
Serial No. 641,274

12 Claims. (Cl. 167—14)

This invention relates to fungicidal compositions and more particularly to broad spectrum fungicidal compositions which are effective in treating the principal turf diseases and various other plant diseases.

This application is a continuation-in-part of our co-pending application Serial No. 525,063, filed July 28, 1955, now abandoned.

Briefly, the present invention is directed to a fungicidal composition comprising a substantially neutral, water-soluble chromium salt, a compound selected from the group consisting of a cadmium salt of an aliphatic dicarboxylic acid having from 4 to 10 carbon atoms, cadmium phthalate and cadmium rubeanate and Victoria green.

Among the objects of the present invention may be mentioned the provision of fungicidal compositions which are effective against a broad range of pathogenic fungi, and yet possess a low order of phytotoxicity; the provision of such fungicidal compositions which are useful both in preventing and controlling outbreak of the principal turf diseases; the provision of fungicidal compositions of this character which are useful in treating other plant diseases; and the provision of fungicidal compositions of this type which may be applied to turf or plants either in the form of an aqueous spray or in dry form employing conventional equipment. Other objects and features will be in part apparent and in part pointed out hereinafter.

The invention accordingly comprises the products hereinafter described, the scope of the invention being indicated in the following claims.

Heretofore, effective control of the major turf diseases has required the use of an assortment of chemicals, whose individual effectiveness was limited to relatively few diseases, and which generally could not be combined satisfactorily because of chemical incompatibilities, varying rates and times of application, and variations in phytotoxicity. Thus, while a given combination might be satisfactory under a particular set of conditions (i. e., season, temperature, condition of turf, etc.), it would generally be useless or even harmful under different conditions. For these reasons, broad spectrum turf fungicidal compositions effective against the various fungi responsible for the principal turf diseases have not previously been available.

In accordance with the present invention, it has now been found that fungicidal compositions comprising a substantially neutral, water-soluble chromium salt, a cadmium salt of a dibasic organic acid and Victoria green, also known as malachite green, are surprisingly effective also known as Malachite green, are surprisingly effective against a broad range of pathogenic fungi and yet possess a low order of phytotoxicity. These novel compositions have been found to be effective against the fungi responsible for the principal turf diseases, commonly known as brown patch, dollar spot, copper spot, melting out, black mold and pink patch. The compositions are useful both for preventing and controlling outbreaks of these diseases. They are also effective against other plant diseases caused by similar fungi.

The preferred proportions of the components of the compositions of the invention are as follows: approximately 5 parts by weight of a substantially neutral, water-soluble chromium salt, approximately 5 to 20 parts by weight of a cadmium salt of a dibasic organic acid, and approximately 0.5 to 4 parts by weight of Victoria green.

As the substantially neutral, water-soluble chromium salt of our fungicidal compositions, we prefer to employ potassium chromate since this compound provides potassium ions which benefit the turf. Other substantially neutral, water-soluble chromium salts such as, for example, sodium chromate and ammonium chromate, may also be used. The chromium salt employed should be soluble in water to the extent of approximately 50 p. p. m., greater solubility being more of a convenience than a necessity.

The preferred cadmium salt is cadmium sebacate but other cadmium salts of dibasic organic acids, such as cadmium succinate, cadmium phthalate, cadmium maleate and cadmium rubeanate are also suitable for use.

It will be understood that the term "Victoria green" when used alone herein includes both the green dye itself and its colorless pseudo-base which is converted to the dye in the presence of air and moisture. For the purposes of the present invention, the green dye and its colorless pseudo-base are equivalents. The pseudo-base of Victoria green corresponds to the following formula:

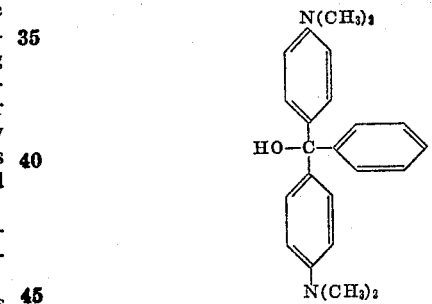

The novel compositions of this invention may also advantageously include one or more optional components such as a nitrogenous component, an iron compound, a thiuram and a surface active agent. A nitrogenous component may be included to increase the vigor of the plants treated and thereby increase their natural resistance to certain diseases and their ability to recover from injury. Suitable nitrogenous components include urea, nitrates such as ammonium nitrate, and nitrogen containing organic materials commonly employed as fertilizers such as sewage sludge, tankage products, plant materials, etc. The inclusion of an iron compound has been found to improve the vigor and appearance of the turf. While various iron compounds could be employed, ferrous sulfate is preferred for use as an iron compound because of its availability, low cost, and because it has also been found to possess significant fungitoxic activity. A thiuram may be included in the compositions of this invention to enhance their effectiveness, particularly against the common turf disease known as brown patch. Exemplary thiurams which may be used include bis-(dimethylthiocarbamyl)disulfide, and bis-(diethylthicarbamyl)disulfide.

In order to promote rapid dispersion of the fungicidal compositions of the invention and to retard settling, it may be desirable to include a surface active agent. The inclusion of a surface active agent also aids the composition in wetting the grass blades, whereby a uniform residual coating of the fungicidal composition results which further increases its effectiveness. For this purpose, anionic surfactants, such as the alkyl aryl sulfonates, have been found to be satisfactory. Other surface active agents may of course be employed.

As a further optional component, a yellow dye such as, for example, auramine O or chrysoidine Y, may be included to brighten the color imparted to turf by Victoria green and also to provide additional fungicidal activity.

The proportions of the above-described optional components may be varied somewhat, but in general the following proportions, relative to the proportions of the other components present, are preferred: approximately 50 parts by weight of a nitrogenous component, approximately 25 parts by weight of an iron compound, approximately 15 to 30 parts by weight of a thiuram, approximately 0.5 part by weight of auramine O or chrysoidine Y, and approximately 9 parts by weight of a surface active agent. Greater proportions may be employed but are not advantageous.

The fungicidal compositions of the present invention may be applied to the turf in the form of an aqueous spray or they may be diluted with a suitable dry diluent such as vermiculite, sand, or fertilizer and applied to the turf in dry form using a spreader. A suitable dosage is one corresponding to 0.05 to 0.2 oz. of the chromium compound per 1000 sq. ft. of turf. For example, a composition containing 5% by weight of the chromium compound would be employed at the rate of 1 to 4 oz. of the composition per 1000 sq. ft. of turf. The amount of diluent, either dry or liquid, required is governed by the equipment available for applying the small amounts of fungicidal compositions needed uniformly and conveniently.

It is preferred that these novel fungicidal compositions be in a finely divided condition for use in the practice of the present invention. For example, an average particle size of approximately 5 microns has been found to be satisfactory. This may be accomplished by milling the mixture or by milling the individual components to the necessary extent prior to mixing.

The following examples illustrate the invention.

*Example 1*

A fungicidal composition having the following composition was prepared:

| Component: | Parts by weight |
|---|---|
| Cadmium sebacate | 5.0 |
| Potassium chromate | 5.0 |
| Victoria green dye | 1.0 |
| Urea | 49.5 |
| Ferrous sulfate | 5.0 |
| Auramine O | 0.5 |
| Bis-(dimethylthiocarbamyl)disulfide | 25.0 |
| Sodium alkyl aryl sulfonate (sold under the trade designation "Nacconol NR") | 9.0 |

*Example 2*

A fungicidal composition having the following composition was prepared:

| Component: | Parts by weight |
|---|---|
| Cadmium sebacate | 10.0 |
| Potassium chromate | 5.0 |
| Victoria green dye | 1.0 |
| Urea | 50.0 |
| Ferrous sulfate | 24.5 |
| Chrysoidine Y | 0.5 |
| Sodium alkyl aryl sulfonate (sold under the trade designation "Nacconol NR") | 9.0 |

*Example 3*

A fungicidal composition having the following composition was prepared:

| Component: | Parts by weight |
|---|---|
| Cadmium sebacate | 5.0 |
| Potassium chromate | 5.0 |
| Victoria green dye | 1.0 |
| Urea | 49.5 |
| Ferrous sulfate | 15.0 |
| Auramine O | 0.5 |
| Bis-(dimethylthiocarbamyl)disulfide | 15.0 |
| Sodium alkyl aryl sulfonate (sold under the trade designation "Nacconol NR") | 9.0 |

*Example 4*

A fungicidal composition having the following composition was prepared:

| Component: | Parts by weight |
|---|---|
| Cadmium sebacate | 5.0 |
| Potassium chromate | 5.0 |
| Victoria green dye | 0.5 |
| Chrysoidine Y | 0.5 |
| Urea | 50.0 |
| Bis-(dimethylthiocarbamyl)disulfide | 30.0 |
| Sodium alkyl aryl sulfonate (sold under the trade designation "Nacconol NR") | 9.0 |

*Example 5*

A fungicidal composition having the following composition was prepared:

| Component: | Parts by weight |
|---|---|
| Cadmium succinate | 5.0 |
| Potassium chromate | 5.0 |
| Pseudo-base of Victoria green dye | 2.0 |
| Urea | 60.5 |
| Ferrous gluconate | 5.0 |
| Auramine O | 0.5 |
| Bis-(dimethylthiocarbamyl)disulfide | 16.0 |
| Sodium alkyl aryl sulfonate (sold under the trade designation "Nacconol NR") | 6.0 |

It will be understood that while the above-described fungicidal compositions are primarily intended for treatment of turf diseases, they are useful for treating other plant diseases caused by similar fungi.

The compositions of Examples 1–5 were tested for effectiveness against the organisms, *Rhizoctonia solani*, *Helminthosporium spp.*, *Fusarium spp.*, *Curvularia spp.*, *Alternaria sp.*, *Pythium sp.*, *Sclerotinia homeocarpa*, *Corticium fuciforme*, *Gloeocercospora sorghi*, *Septoria sp.*, and *Pseudopeziza sp.* The effective dose ($ED_{50}$) of these compositions against each of the above-listed organisms was found to be less than 75 p. p. m. The compositions were also found to be unusually effective against the spores of *Curvularia spp.*

The fungicidal compositions of Examples 1–5 were also tested on a number of growing plants including tomatoes, tobacco, bent grasses, clover, alfalfa, brome grass, wheat, Merion bluegrass, and oats, and found to be noninjurious at concentrations several times greater than would normally be encountered in actual use.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

We claim:

1. A fungicidal composition comprising approximately 5 parts by weight of a substantially neutral, water-soluble chromium salt, approximately 5 to 20 parts by weight of a compound selected from the group consisting of a cadmium salt of an aliphatic dicarboxylic acid having from 4 to 10 carbon atoms, cadmium phthalate and cadmium rubeanate and approximately 0.5 to 4 parts by weight of Victoria green.

2. A fungicidal composition comprising approximately 5 parts by weight of a compound selected from the group consisting of potassium chromate, sodium chromate and ammonium chromate, approximately 5 to 20 parts by weight of a compound selected from the group consisting of cadmium sebacate, cadmium succinate, cadmium phthalate, cadmium maleate and cadmium rubeanate and approximately 0.5 to 4 parts by weight of Victoria green.

3. A fungicidal composition comprising approximately 5 parts by weight of potassium chromate, approximately 5 to 20 parts by weight of cadmium sebacate and approximately 0.5 to 4 parts by weight of Victoria green.

4. A fungicidal composition comprising approximately 5 parts by weight of potassium chromate, approximately 5 to 20 parts by weight of cadmium sebacate, approximately 0.5 to 4 parts by weight of Victoria green and approximately 0.5 part by weight of a substance selected from the group consisting of auramine O and chrysoidine Y.

5. A fungicidal composition comprising approximately 5 parts by weight of potassium chromate, approximately 5 to 20 parts by weight of cadmium sebacate, approximately 0.5 to 4 parts by weight of Victoria green and approximately 0.5 part by weight of auramine O.

6. A fungicidal composition comprising approximately 5 parts by weight of potassium chromate, approximately 5 to 20 parts by weight of cadmium sebacate, approximately 0.5 to 4 parts by weight of Victoria green and approximately 0.5 part by weight of chrysoidine Y.

7. A fungicidal composition comprising approximately 5 parts by weight of a substantially neutral, water-soluble chromium salt, approximately 5 to 20 parts by weight of a compound selected from the group consisting of a cadmium salt of an aliphatic dicarboxylic acid having from 4 to 10 carbon atoms, cadmium phthalate and cadmium rubeanate, approximately 0.5 to 4 parts by weight of Victoria green, approximately 5 parts by weight of urea, approximately 25 parts by weight of ferrous sulfate and approximately 15 to 30 parts by weight of bis-(dimethylthiocarbamyl)disulfide.

8. A fungicidal composition comprising approximately 5 parts by weight of potassium chromate, approximately 5 to 20 parts by weight of cadmium sebacate, approximately 0.5 to 4 parts by weight of Victoria green, approximately 50 parts by weight of urea, approximately 25 parts by weight of ferrous sulfate and approximately 15 to 30 parts by weight of bis-(dimethylthiocarbamyl)disulfide.

9. A fungicidal composition comprising approximately 5 parts by weight of potassium chromate, approximately 5 parts by weight of cadmium sebacate, approximately 1 part by weight of Victoria green, approximately 49.5 parts by weight of urea, approximately 5.0 parts by weight of ferrous sulfate, approximately 25 parts by weight of bis-(dimethylthiocarbamyl)disulfide, approximately 0.5 part by weight of auramine O, and approximately 9 parts by weight of a surface active agent.

10. A fungicidal composition comprising approximately 5 parts by weight of potassium chromate, approximately 10 parts by weight of cadmium sebacate, approximately 1 part by weight of Victoria green, approximately 50 parts by weight of urea, approximately 24.5 parts by weight of ferrous sulfate, approximately 0.5 part by weight of chrysoidine Y, and approximately 9.0 parts by weight of a surface active agent.

11. A fungicidal composition comprising approximately 5 parts by weight of potassium chromate, approximately 5 parts by weight of cadmium sebacate, approximately 1 part by weight of Victoria green, approximately 49.5 parts by weight of urea, approximately 15 parts by weight of ferrous sulfate, approximately 15 parts by weight of bis-(dimethylthiocarbamyl)disulfide, approximately 0.5 part by weight of auramine O and approximately 9 parts by weight of a surface active agent.

12. A fungicidal composition comprising approximately 5 parts by weight of potassium chromate, approximately 5 parts by weight of cadmium sebacate, approximately 0.5 part by weight of Victoria green, approximately 50 parts by weight of urea, approximately 30 parts by weight of bis-(dimethylthiocarbamyl)disulfide, approximately 0.5 part by weight of chrysoidine Y and approximately 9 parts by weight of a surface active agent.

References Cited in the file of this patent

UNITED STATES PATENTS

| | | |
|---|---|---|
| 1,534,289 | Teppett | Apr. 21, 1925 |
| 1,568,455 | Hedenburg | Jan. 5, 1926 |
| 2,573,738 | Smith | Nov. 6, 1951 |

OTHER REFERENCES

Frear: Chem. of Insecticides, Fungicides and Herbicides, 2nd ed., 1948, pp. 266, 271, 283 and 311.

Frear: A Catalogue of Insecticides and Fungicides, vol. 2, 1948, p. 23.

Howard, F. L.: Greenkeeper's Reptr., 15(2):10, 1947, thru (2) Frear: Chemistry of Insecticides, Fungicides and Herbicides, 3rd ed., 1955, pp. 364, 366.